United States Patent
Fleming et al.

(10) Patent No.: US 9,807,237 B2
(45) Date of Patent: Oct. 31, 2017

(54) SYSTEM AND METHOD FOR A PROGRESSIVE DIALER FOR OUTBOUND CALLS

(71) Applicant: Vonage Business Inc., Atlanta, GA (US)

(72) Inventors: Barry Fleming, Roswell, GA (US); Joshua Ferrell, Kennesaw, GA (US); Ann Santorios, Chantilly, VA (US); Randy Layman, Marietta, GA (US)

(73) Assignee: VONAGE BUSINESS INC., Atlanta, GA (US)

( * ) Notice: Subject to any disclaimer, the term of this patent is extended or adjusted under 35 U.S.C. 154(b) by 99 days.

(21) Appl. No.: 14/317,743

(22) Filed: Jun. 27, 2014

(65) Prior Publication Data

US 2015/0381809 A1 Dec. 31, 2015

(51) Int. Cl.
*H04M 3/523* (2006.01)
*H04M 3/51* (2006.01)

(52) U.S. Cl.
CPC ....... *H04M 3/5232* (2013.01); *H04M 3/5158* (2013.01)

(58) Field of Classification Search
CPC .... H04M 3/5158; H04M 3/51; H04M 3/5191; H04M 3/5183; H04M 3/42323; H04M 3/5232; H04M 3/523; H04M 2203/402; H04M 3/42365
USPC .................................................... 379/265.11
See application file for complete search history.

(56) References Cited

U.S. PATENT DOCUMENTS

| | | | | |
|---|---|---|---|---|
| 5,517,566 A * | 5/1996 | Smith | ................. | H04M 3/5158 379/265.03 |
| 6,411,805 B1 * | 6/2002 | Becker | ................. | H04M 3/523 379/201.01 |
| 6,539,015 B2 * | 3/2003 | Voit | ................. | H04L 12/1421 370/389 |
| 6,804,346 B1 * | 10/2004 | Mewhinney | ........ | H04M 3/5158 379/265.1 |
| 2005/0169454 A1 * | 8/2005 | Gregerson | .......... | H04M 3/5183 379/265.09 |
| 2011/0286592 A1 * | 11/2011 | Nimmagadda | ..... | H04M 3/5238 379/266.06 |
| 2012/0099720 A1 * | 4/2012 | Soundar | ............. | H04M 3/5158 379/265.02 |

* cited by examiner

*Primary Examiner* — Ahmad F Matar
*Assistant Examiner* — Jirapon Intavong
(74) *Attorney, Agent, or Firm* — Alexander Legal LLC; Joseph Pagnotta (57) ABSTRACT

A system and method are disclosed herein for an automated progressive dialer system. The system comprises maintaining a callee database for a calling campaign. A Presence registrar is maintains a list of call center agents, wherein the list comprises the agent's current state, account information and other metrics. An agent progressive dialer (APD) indicates an agent's current state to the Presence registrar and maintains an agent's open line to connect with a connected outbound call to a callee. One or more callees are selected to call based upon the agent's current state. Outbound calls are placed to the selected callee using a callee progressive dialer (CPD). Upon successfully connecting a call to a callee, the Presence registrar provides an available agent with an open line to receive the call. The CPD then bridges the successfully connected callee outbound call with the available agent's open line on the APD.

16 Claims, 4 Drawing Sheets

SYSTEM AND METHOD FOR A PROGRESSIVE DIALER FOR OUTBOUND CALLS

FIELD OF THE INVENTION

The present invention relates generally to an automated system for outbound calls. In particular, embodiments of the present invention disclose an intelligent system for automating the process for calling leads and for connecting the calls to agents.

BACKGROUND OF THE INVENTION

In the field of telephony, call centers exist for handling transactions for companies marketing to consumers of products and services. One function available in many call centers is proactive outbound calling of potential new and/or existing customers for the purpose of engaging those customers in the sales process (also known as Outbound Dialing Campaigns). The purpose of the Outbound Dialing Campaigns is to generate new transactions. Outbound Dialing Campaigns are run inside a call center using an automated dialing device that has been placed in automatic dialing mode. Automatic dialing modes may include progressive dialing mode and predictive dialing mode. Unfortunately, Automatic Outbound Dialing Campaigns do not guarantee a connection between the live potential customer and a live agent after the call is answered. In predictive dialing, the system dials more calls than there are available agents to handle the calls based on the assumption that some of those call attempts will not be successfully connected. Therefore, an agent may not appear as available for all the calls that are placed.

In progressive dialing mode the telephony system places a call only when it discovers an agent available to take the call. However, the designated agent may become distracted by some other processing tasks and suddenly become unavailable to accept the dialed outbound call. Some progressive and predictive dialers wait to begin the dialing process based on an "average time on call" or an "average processing time," of the live agent or agent(s) that are available to take calls. Additionally, traditional methods have implemented predictive dialers and progressive dialers as an add-on or third party device within a company's telephony system.

A Private Branch Exchange (PBX) is a telephone exchange system that facilitates connections among the internal telephones of an organization, such as a corporation, business, or other private telephone network. The PBX allows these internal telephones to connect to the public switched telephone network (PSTN) via trunk lines and/or via the Internet. A hosted PBX system delivers PBX functionality as a service, available over the PSTN and/or the Internet. A telephone company typically provides hosted PBXs using equipment located on the premises of the telephone company's exchange. In a hosted PBX system, the customer organization does not need to buy or install PBX equipment and the telephone company can use the same switching equipment to service multiple PBX hosting accounts in multiple locations. Furthermore, Voice-over-Internet-Protocol (VoIP) gateways can be combined with traditional PBX functionality enabling businesses and organizations to use their managed Internet/Intranet to help reduce long distance expenses and to enjoy the benefits of a single network for voice and data, which gives greater cost savings, mobility and increased redundancy.

A hosted VoIP PBX system allows the users to place calls from, for example, session initiation protocol (SIP) devices over the Internet. A full description of the SIP process can be found in the Network Working Group's white paper entitled "SIP: Session Initiation Protocol," by J. Rosenberg, et al that was published in June 2002 by The Internet Society. SIP devices can include telephone style terminals or web-based "soft phones" that provide voice calling via a virtual PBX. The virtual PBX has the ability to route calls and other communications out to traditional communications networks such as PSTN systems. In a common configuration, a SIP device has a static Internet protocol (IP) address in its configuration settings. This static IP address is used for standard forwarding of IP packets for call routing, SIP services and load balancing. The IP addresses allow SIP device service requests, such as a request to initiate, transfer, or terminate a call, to be forwarded to a fixed set of servers or load-balancers. These SIP devices and SIP services allow for the integration of a progressive dialer system within the functionality of the hosted VoIP PBX system.

The integration of the progressive dialer system within the functionality of the hosted VoIP PBX system is made possible through the use of IP addressing methods. IP addresses are typically a set of numbers that identify the location of a port in an Internet protocol network. Unfortunately, these addresses are often difficult to remember and keep track of. Therefore, Internet architecture includes natural language addressing mechanisms in the form of Universal Resource Locator (URL) addresses. These URL addresses include typical web addresses such as www.google.com®. A URL address allows an administrator or the telephony system to assign a natural language address to an IP device or service. This natural language address can be resolved back to an IP address using a Domain Name System (DNS) server.

The DNS translates URL and other web addresses into Internet Protocol (IP) addresses. DNS implements a distributed database to store this name and address information for all public hosts on the Internet. DNS assumes IP addresses do not change (are statically assigned rather than dynamically assigned). In SIP, the IP addresses typically have statically assigned IP addresses. The DNS database resides on a hierarchy of special database servers. When client SIP devices issue requests involving Internet host names, a software tool called the DNS resolver (usually built into the network operating system) first contacts a DNS server on the lowest level of hierarchy to determine the destination server's IP address. If the DNS server does not contain the needed mapping address, it will in turn forward the request to a different DNS server at the next higher level in the hierarchy. After potentially several forwarding and delegation messages are sent within the DNS hierarchy, the IP address for the given Internet host name eventually arrives at the DNS resolver. The DNS resolver is then in turn able to resolve the DNS address of a SIP device request by directing it to the destination server IP address as resolved by DNS.

While ordinary DNS practices can respond to simple requests as described above, a hosted VoIP PBX environment needs a method of routing communications between its various components. For example, communications between a SIP device and the VoIP PBX require an addressing method such as IP and DNS to "bridge" the packets of data being routed between these components. Furthermore, there exists a need for a hosted PBX environment that can provide progressive dialing functionality without the need for additional components.

The present invention meets one or more of the above-referenced needs as described herein in greater detail.

SUMMARY OF THE INVENTION

The present invention relates generally to an automated outbound call system. In particular, embodiments of the present invention disclose an intelligent system for automating the process for calling leads and for connecting the calls to agents. Briefly described, aspects of the present embodiments include the following.

A system and method are disclosed herein for providing a progressive dialing system in a hosted VoIP PBX environment. The system features a Progressive Dialer that functions similar to a call-monitoring device. Upon startup the Progressive Dialer will receive a call from an Agent who is ready and available to connect to an outbound call. The system will use device properties to verify and authenticate the Agent before connecting the outbound call to the Agent. Upon successful authentication, a presence notification is forwarded to a Presence Registrar within the system to indicate that the Agent is available and idle. The system provides a Click-to-Call like application programming interface (API) that allows an Agent to indicate their availability (or presence) for a call, to receive information about an account associated with the call and to record audio and analytics related to the call.

In an exemplary embodiment, Agents can indicate their availability to connect to and process a call by dialing into an Agent Progressive Dialer (APD) through, for example, a click-to-call user interface. Once the Agent dials in, the Agent's presence is updated in the Presence Registrar that contains a list of Agents and their current state. The Progressive Dialing System selects a list of Callees for outbound calls. A Callee Progressive Dialer (CPD) places calls to Callees who have been selected for outbound calls. When a Callee answers a call, the CPD immediately contacts the Presence Registrar for an available Agent from among the list of Agents, to handle the call. Once an available Agent is selected, the CPD connects the call to the APD associated with the available Agent. At the same time, the APD triggers a screen pop to provide the Agent with information about the call (i.e. the dialed number, Callee's name, account information, etc.). At the end of the call, the Agent can mark the call disposition, other analytics and features in the screen pop. When the call ends, the Presence Registrar detects Agent availability and begins dialing additional phone numbers.

In a further embodiment, the system comprises maintaining a Callee database for a Calling Campaign. A Presence Registrar maintains a list of call center Agents, wherein the list comprises the Agent's current state, agent identifiers and other metrics. An Agent Progressive Dialer (APD) indicates an Agent's current state to the Presence Registrar and maintains an Agent's open line to connect with a connected outbound call to a Callee. One or more Callees are selected to call based upon the Agent's current state. Outbound calls are placed to the selected Callee using a CPD. Upon successfully connecting a call to a Callee, the Presence Registrar provides an available Agent with an open line to receive the call. The CPD then bridges the successfully connected Callee outbound call with the available Agent's open line on the APD.

In an embodiment, the present invention provides a system for establishing a communication session. The system comprises a plurality of Agent Terminals wherein each Agent Terminal is communicatively coupled to an inbound communication unit. An agent availability unit is provided for registering the status for each of the plurality of Agent Terminals. A recipient database containing a plurality of recipient identifiers is also provided. Further in an exemplary embodiment, a recipient selection unit is communicatively coupled to the agent availability unit and to the recipient database. The recipient selection unit is further configured to select one or more selected identifiers from the plurality of recipient identifiers based on a status indication received from the agent availability unit.

Further in the exemplary embodiment, an outbound communication unit is further communicatively coupled to the recipient selection unit and to the agent availability unit. The outbound communication unit is configured to perform a number of functions. For example, the outbound communication unit is configured to receive the one or more selected identifiers from the recipient selection unit. The outbound communication unit is further configured to transmit a communication request directed to a first selected identifier of the one or more selected identifiers. When the outbound communication unit receives an indication of communication acceptance, it establishes a first communication path with a Recipient Terminal associated with the first selected identifier. It then transmits an agent selection request to the agent availability unit.

Further in the exemplary embodiment, the agent availability unit is configured to select a first Agent Terminal from the plurality of Agent Terminals. The agent availability unit makes this selection in response to receiving an Agent selection request. The inbound communications unit is configured to establish a second communication path with the first Agent Terminal. The first communication path is bridged with the second communication path using a connection unit.

In an embodiment the present invention provides a method for establishing a communication session. The method comprises establishing a plurality of communication paths, each with a plurality of individual Agent Terminals. The plurality of communication paths includes establishing a first communication path with a first Agent Terminal selected from the plurality of Agent Terminals. An agent availability unit for receiving a plurality of indications of agent availability. Each of the plurality of indications of agent availability is associated with one of the plurality of Agent Terminals. Indications of agent availability can include a first indication of agent availability associated the first Agent Terminal. The method then selects one or more Recipient Terminals based on the plurality of indications of agent availability. An outbound communication unit transmits a communication request to a first Recipient Terminal selected from the one or more Recipient Terminals. The outbound communication unit receives an indication of communication acceptance. A second communication path is then established with the first Recipient Terminal. Finally the first communication path is bridged with the second communication path based on the first indication of agent availability.

This invention thereby provides an alternate and improved architecture for progressive call dialing in a hosted VoIP PBX system. The present invention provides an intelligent system for progressive dialing that is in compliance with United States Federal Communications Commission (FCC) regulations for automated dialing.

The above features as well as additional features and aspects of the present invention are disclosed herein and will become apparent from the following description of preferred embodiments of the present invention.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Before the present methods and systems are disclosed and described in greater detail hereinafter, it is to be understood that the methods and systems are not limited to the disclosed methods, components, or implementations. It is also to be understood that the terminology used herein is for the purpose of describing particular aspects and embodiments only and is not intended to be limiting.

As used in the specification and the appended claims, the singular forms "a," "an," and "the" include plural referents unless the context clearly dictates otherwise. "Optional" or "optionally" means that the subsequently described event or circumstance may or may not occur, and the description includes instances where the event or circumstance occurs and instances where it does not.

Throughout the description and claims of this specification, the word "comprise" and variations of the word, such as "comprising" and "comprises," mean "including but not limited to," and are not intended to exclude, for example, other components, integers or steps. "Exemplary" means "an example of" and is not intended to convey an indication of preferred or ideal embodiment. "Such as" is not used in a restrictive sense, but for explanatory purposes.

Disclosed herein are components that can be used to perform the disclosed methods and systems. It is understood that when combinations, subsets, interactions, groups, etc. of these components are disclosed that although specific reference to each various individual and collective combinations and permutations cannot be explicitly disclosed, each is specifically contemplated and incorporated herein, for all methods and systems. This applies to all aspects of this specification including, but not limited to, steps in disclosed methods. Thus, if there are a variety of additional steps that can be performed it is understood that each of the additional steps can be performed with any specific embodiment or combination of embodiments of the disclosed methods.

As will be appreciated by one skilled in the art, the methods and systems may take the form of an entirely new hardware embodiment, an entirely new software embodiment, or an embodiment combining new software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, non-volatile flash memory, CD-ROMs, optical storage devices, and/or magnetic storage devices. An exemplary computer system is detailed in the discussion of FIG. 4 below.

Embodiments of the methods and systems are described below with reference to block and flowchart diagrams of methods, systems, apparatuses and computer program products. It will be understood that each block of the block diagrams and flowchart diagrams, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks contained in the block diagram and flowchart diagrams support combinations of means for performing the specified functions, combinations of steps for performing the specified functions and program instruction means for performing the specified functions. It will also be understood that each block of the block diagram and flowchart diagrams, and combinations of blocks in the block diagram and flowchart diagrams, can be implemented by special purpose hardware-based computer systems that perform the specified functions or steps, or combinations of special purpose hardware and computer instructions.

Figure 1:
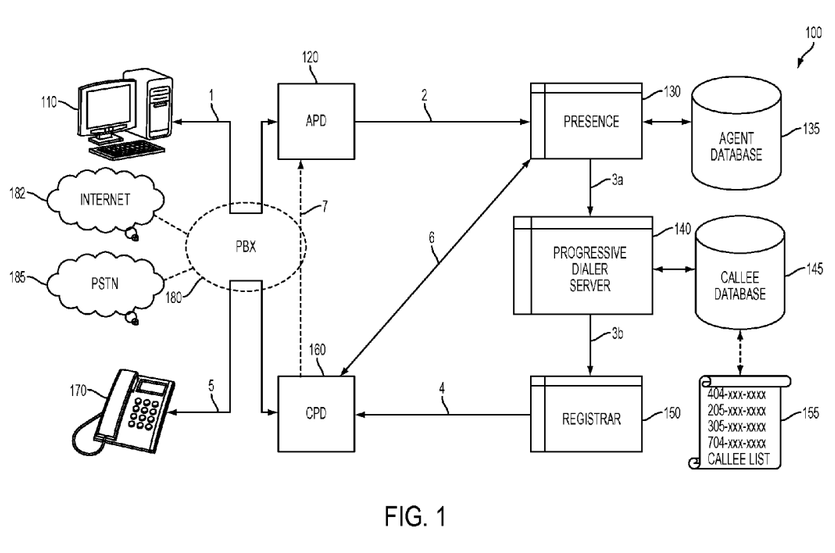
FIG. 1 is a block diagram of an exemplary embodiment of a system for Progressive Dialing in a hosted VoIP PBX environment.

FIG. 1 is a block diagram that details the various aspects of an exemplary embodiment in which the present methods and systems can operate. More specifically, FIG. 1 illustrates a block diagram for an alternate and improved architecture for a progressive call dialing system and method 100. The discussion of FIGS. 1-3 will include examples related to a progressive call dialing system and method in a hosted voice over Internet (VoIP) private branch exchange (PBX) system. However, the system and method for the progressive call dialing system could be implemented in other telephony systems and is not limited to a hosted VoIP PBX system. Furthermore, those skilled in the art will appreciate that the present system and methods can operate in other IP network environments and publicly switched telephone network (PSTN) systems. In fact, the systems and methods disclosed herein are also applicable to systems related to IP devices and other computer networking system components that employ both digital and analog equipment. One skilled in the art will also appreciate the fact that the respective functions described herein can be performed by software, hardware, or a combination of software and hardware.

Calling Campaigns are typically marketing and sales projects. A Campaign is a group of calls to be made by agents. These Campaigns often comprise a list of Callees 170 or customers that a marketing or sales team would like to reach. In one embodiment, the Callee List 170 is a list of phone numbers to dial. The Calling Campaign will typically employ a group of agents 110 for operating specialized computer terminals for speaking with Callees 170. In the present invention, the Agents 110 are also provided a screen pop (See FIG. 3) with radio buttons for call analytics and tracking. The Campaign is often in the form of a script from the marketing team as described in the discussion of FIG. 3 below. The Campaign and the Callee List 155 are separate so that they can be mixed and matched as desired from the progressive dialer administrator. For example, calls during the month of May can include Callee List A and a first Campaign to tell customers about a company's Memorial Day sale. The following month, Agents 110 can use the same Callee List A and a second Campaign to call customers about the company's summer special.

The Agents 110 often have received special training to speak with the Callees 170. In an embodiment, the Agents 110 are provided a script for engaging the Callees 170 and addressing the Callee's 170 questions. In an embodiment, Campaigns are single entities from the perspective of Agents 110—they see the same behavior, use the same script, etc. However, from the administrator's perspective, Campaigns have multiple sources (lists) of phone numbers. The Campaign includes a list of all allowed dispositions (not shown, but understood to those of skill in the art) for the Campaign as well as a map of what actions to take for given dispositions and various other configuration settings for how the Campaign should behave (abandon message, voicemail message, etc.).

The Campaign also has an eligible disposition list. The disposition is the outcome of the call. The Agents 110 taking the call and the System 100 both assign the dispositions. The system assigned dispositions are fixed as part of the system—Busy, Fast Busy, Ring-No-Answer (RNA), Connected, Disconnected, Voicemail. In an embodiment, an Administrator creates the agent dispositions. This includes a list of dispositions from the previous attempts to reach a Callee 170. This allows administrators to run the list through in its entirety once and then retry the voicemail, ring-no-answer and busy calls while tweaking metrics, such as, the number of calls per Agent 110 or Agents 110 in the pool.

In FIG. 1, the Agents 110 indicate their availability on the system by connecting to an open line within an Agent Progressive Dialer (APD) 120 system. The Agents 110 operate a computer terminal to engage customers on calls and enter customer information and analytics. In an embodiment, the Agent 110 enters a presence code (e.g., an alphanumeric character sequence preceded by an asterisk or like symbol) into their terminal to indicate their availability to accept a customer calls. The APD 120 will prompt the agent for a personal identification (PIN) code. The agent's PIN code and the agent's phone extension combination are used to authenticate and verify that the Agent 110 is part of an auto-dialer Campaign, as illustrated by line 1. As the Agent 110 enters their presence code into their computer or phone terminal, the terminal is in communication with the APD 120. The Agent 110 can be communicatively connected to the APD 120 via a direct connection, a network connection 182, a PSTN connection 185 or via a PBX 180 connection. The PBX 180 can be a conventional PBX system, a hosted PBX system, or a hosted VoIP PBX system. If a further embodiment, the System 100 is a component within a Hosted VoIP PBX 180 system and the like. The APD 120 is alerted to this change in the Agent's 110 state to indicate that the Agent 110 is currently available and idle. The APD 120 will immediately share this Agent 110 information with the Presence system 130 as illustrated by line 2.

The Presence system 130 is a registry that maintains a list of all Agents 110 within a Calling Campaign. The Presence system 130 contains real-time information about each Agent 110 within the Calling Campaign as well as their current state. The Agent's 110 current state is communicated to the Presence system manually by the Agent 110 or an administrator or automatically via a screen pop detection or heart beat ping. In an embodiment, an Agent's 110 state can be available and idle; busy and unavailable; or busy and after-call work. In a further embodiment, the Presence System 130 can access an Agent database 135 that contains information related to the type of Calling Campaign an Agent 110 has been trained for or the Campaigns that an Agent 110 is authorized to participate in. The Agent database 135 can further contain information related to the Agents 110 such as the amount of time an Agent 110 has been idle, an Agent's 110 performance metrics, an Agent's 110 customer feedback rating, and other metrics. These metrics and states can be used by the APD 120 to select an Agent 110 to connect to an available Callee 170 that is on the line. With its list of Agents 110 and their current states, the Presence system 130 is in communication with the Progressive Dialer Server (PDS) 140, as illustrate by flow line 3a.

The primary function of the PDS 140 is to listen to the Presence system 130 and take action when the state of the phone system changes. The PDS 140 will monitor the Presence system 130 by login to a dashboard application program interface (API) and start listening for updates. When an update comes in, the status of the Agents 110 and calls will be parsed out. If necessary, more phone numbers will be selected and Click-to-Calls to those numbers will be established.

In a further exemplary embodiment, the PDS 140 is responsible for determining the number of waiting agents, the number of calls in the setup state (outbound calls waiting to be dialed), and the calls per agent factor (number of calls dialed per agent). Once these values are known, the PDS 140 can initiate the proper number of outbound phone calls to Callee's 170. However, any number of performance factors can be used by the PDS 140 to determine the number of outbound calls placed relative to the number of available agents. These performance factors can included the number of outbound calls processed per hour, number of user communications actions per minute (load), number of concurrent communications users (agents), average number of work items per agent and volume of customer data.

The PDS 140 maintains the list of numbers to be dialed or a list of Callees 170 in its Callee database 145. The listed Callee's 170 are selected from a Calling Campaign. The list of Callees 170 can include current customers, older customers, and generally any entity with a phone number. The Callee database 145 includes a Callee list 155, which is an ordered list of phone numbers to call. In an embodiment, a Callee list 155 can include the actual digits to dial; associated metadata; a list of the call history; and a link to the last entry of the call history. The Callee database 145 also stores the call history. The call history tracks what happened on a previous call. The call history includes the time the call started, the agent or system assigned disposition, and the next action for that phone number. If relevant, the Agent 110 and Agent's 110 dispositions are also captured (or the can be stored in the Agent DB 135.).

In an embodiment, there can be any number of PDSs 140 operating within a hosted VoIP PBX 180 system. In a highly available system there may be multiple redundant PDSs 140 and Callee databases 145. If one of the PDS 140 servers fail, there may be multiple redundant PDS 140 servers to replace the failed unit. Typically these redundant servers will health check the other servers every 10-15 seconds, for example. If a health check fails, then all accounts associated with the various Calling Campaign's assigned to the failed PDS 140 can be redistributed among the other PDS 140 servers.

Once the PDS 140 has selected a Calling Campaign with a list of Callees 170, it initiates a SIP or click-to-call (C2C) API operation for each Callee 170 via a Registrar 150, as illustrated by flow line 3*b*. The Registrar 150 is simply a type of domain name system (DNS) server for forwarding SIP calling packets. The Registrar 150 allows the system to route the calls to an appropriate call handling server cluster hosting a Callee Progressive Dialer (CPD) 160 using an account-based DNS (ABDNS) routing method. ABDNS is an address and routing method that allows account information to be placed in a universal resource locator (URL) address. The Registrar 150 is able to parse the ABDNS address to discern the account information in the address. This allows the Registrar 150 to determine which call handling cluster or CPD 160 that has been designated or has the capacity to process the outbound calls. The Registrar 150 can resolve the ABDNS address into an IP address for routing the outbound calls to the appropriate CPD 160, as illustrated by flow line 4. ABDNS is only one of many routing methods that can be used. For example, methods incorporating other IP protocols or the DNS SRV (server) protocol can also be used.

The CPD 160 receives the SIP call request and opens an outbound line within the PBX to place a call to a Callee 170, as illustrated by flow line 5. The CPD 160 can be communicatively connected to the Callee 170 via a direct connection, a network connection 182, a PSTN connection 185 or via a PBX 180 connection. If the call connects, the CPD 160 will make an API request to the Presence system 130 to determine which Agents 110 are currently idle, as illustrated by flow line 6. In one embodiment, the Presence System 130 will select the Agent 110 that has been idling the longest and update the Agent's 110 status to indicate the Agent 110 is now busy. In an embodiment, the Presence system 130 can use an update API set-if-not-set construct to change the state of an Agent 110 in the Agent database 135. Once the agent has been reserved, the CPD 160 will initiate a SIP call to the server hosting the APD 120. The Callees' 170 line can then be bridged together (as explained below) with the open Agent's 110 line so that the Agent 110 can talk to the outbound Callee 170. The CPD 160 will make an API call to the Presence system 130 to set the disposition and metrics about connect time. If the call does not connect, an API call is made to set the disposition for the number (Disconnected, Busy, or Ring-No-Answer) and the session terminates.

In an embodiment, both the APD 120 and the CPD 160 are capable of initiating and handling SIP messaging; connecting or disconnecting VoIP audio streams; and receiving, forwarding, or bridging VoIP audio streams. Leveraging these capabilities, once a callee is successfully connected, the CPD 160 initiates a call to the APD 120, the APD 120 then connects/bridges the Agent's 110 open line to the call and the CPD 160 connects/bridges the connected Callee 170 (the audio to the called party) on the outbound call to the Agent's 110 open line (the connection indicated by line 7). To disconnect, the CPD 160 terminates the SIP session with a "BYE" requests as in all other calls. The agent's line remains open on the APD 120. The CPD 160 disconnects and the call connection between the CPD 160 and the APB 120, as illustrated by line 7, is terminated.

Figure 2:
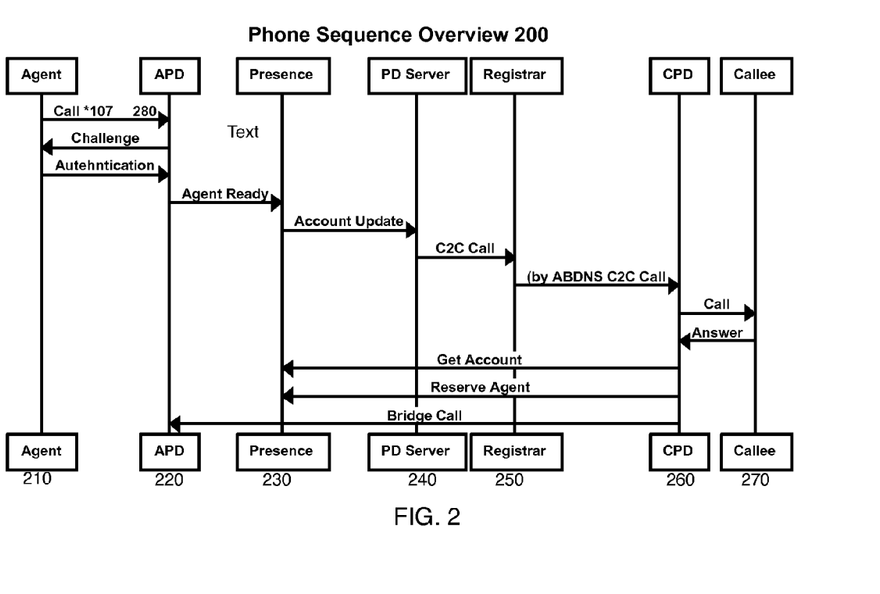
FIG. 2 is a sequence diagram of an exemplary embodiment of a Progressive Dialing method.

Turning now to FIG. 2, a sequence diagram 200 is provided for illustrating a method of providing a progressive dialing System. In an exemplary embodiment, Agents 210 dial a Presence Code 280 (e.g., a special star code, an alphanumeric character sequence preceded by an asterisk or like symbol) on their phone or SIP devices to be connected to the Agent Progressive Dialer (APD) 220 service. The APD 220 will prompt the Agent 210 for a PIN code and verify that the Agent 210 is part of an auto-dialer Campaign (using the Agent's 210 phone extension and PIN combination). Once authenticated the APD 220 will update the Presence system 230 to indicate that the agent is currently idle, but available. In an embodiment, the entry of the Presence Code 280 by the Agent 210 creates an open line for the Agent 210 to be connected to a Callee 270 (as illustrated by the flow line 1, in FIG. 1 above). Therefore, the Agent 210 maintains an open line within the call center. This reduces the time required to connect an Agent 210 to a call once a Callee 270 becomes available. This allows the System 100 to be more compliant with the United States Federal Communications Commissions (FCC) regulations governing automated dialing systems.

The APD 220 is an intelligent system for determining an Agent's 210 presence and availability to process an outbound automatically dialed number in a call center environment. The ADP 220 can exist as an application executing on a server within the call center environment. In an embodiment, the APD 220 is an application that executes on a server in a hosted VoIP PBX environment. The APD 220 is alerted to the presence of a particular Agent 210 when that agent dials the Presence Code 280 to indicate their presence and availability within the call center network.

The Presence system 230 is a cache that contains the current state of all Agents 210 whether they are idle, on a call or in "after call work" mode. When an Agent 210 dials into the APD 220, they alert the Presence registrar 230 as to their availability and are placed into a queue or agent cluster. The ADP 220 server continuously monitors the Presence system 230 to track the availability of agents in the agent cluster. The Presence system 230 also maintains an agent database containing a list of agents including their presence status, their analytics, and the agent's profile information. Each Agent 210 is assigned a calling factor that comprises analytical information related to each Agent 210, such as their average calling times, types of calls they are most skilled at processing, types of calls they are authorized to process, quality control measures, and the like.

Once the Presence system 230 has been updated with a new Agent 210, resulting in a presence update, the Progressive Dialer Server (PDS) 240 will calculate the number of calls needed in setup by, for example, multiplying the number of agents idle (waiting on a call) and the agent calling factor. The PDS 240 receives an account update related to the number of Agents 210 available in an Agent cluster and the number of calls that should be placed for a particular Calling Campaign. The PDS 240 will select the numbers to dial and place a SIP or Click-to-Call API for each Callee 270 out the Registrar 250.

The Click-to-Call (C2C) initiated call is routed to the appropriate call handling server cluster via a Registrar 250 (domain name system—DNS) based on an account-based DNS (ABDNS). Once the C2C is routed to the appropriate call handling server CPD 260 via the ABDNS, the Callee Progressive Dialer (CPD) 260 application launches. The CPD 260 will then initiate an outbound call using the account's PBX to each Callee 270 selected by the PDS 240.

The CPD 260 is an application that sits within the calling handing server clusters for selecting and processing the outbound calls. By using ABDNS, a CPD 260 associated with the Agent 210 or cluster of agents' accounts or Calling Campaign is selected. This selection allows calls between the CPD 260 and APD 220 to be easily bridged together using a SIP connection as explained below.

Figure 3:
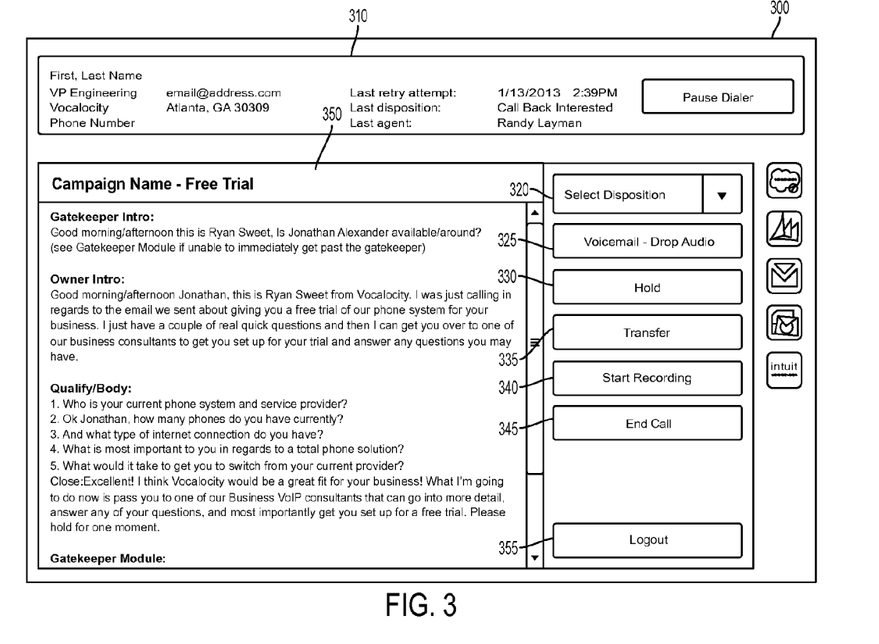
FIG. 3 is a screen pop of an exemplary embodiment of a Progressive Dialing method.

The CPD 260 receives the number to call, campaign settings (abandoned messages, custom tags). If the call connects, the CPD 260 device will make an API request to the Presence system 230 to gather the account information associated with the Callee 270 from a Calling Campaign database stored within the Presence system 230. Alternatively, the Callee's 270 information may be stored within a callee database within the CPD 260 so that it can be forwarded to the presence system. The CPD 260 also contacts the Presence system 230 to determine the list of Agents 210 within the agent cluster that are currently idle and available. CPD 260 then requests the Presence system 230 to reserve an available Agent 210 for the call. The CPD 260 instructs the Presence system 230 to forward the Callee's 270 caller ID, caller name, custom tags and other data to the APD 220 for use by the selected Agent 210. In an exemplary embodiment, the Agent 210 receives a pop-up window 300 at their terminal as illustrated in FIG. 3 that contains the Campaign script 350 populated with the Callee's 270 information 310. The pop-up window may also contain other radio buttons 320-355 and information for the call. The Agent 210 may also select the disposition of the call by adjusting and selecting certain parameters within the popup window 300.

In an exemplary embodiment, the Presence system 230 will select the Agent 210 that has been idle the longest and update the Agent's 210 status in the Presence system 230 to indicate that the Agent 210 is now active and busy. The Presence system 230 can also select the agent based on other factors such as the Agent's ability (or training) to process certain types of calls, the Agent's efficiency in processing certain types of calls, the Agent's authorization to process certain types of calls, etc. Once the Agent 210 has been reserved, the CPD 260 will initiate a SIP call to the APD 220. A SIP API or bridge API is used to bridge the PBX handling the outbound call from the CPD 260 to the server executing the APD 220. This will allow the Agent 210 to be placed in direct communication with the outbound Callee 270. The APD 220 can further set the disposition 320 and metrics about the call so that it can be recorded in the Presence system 230.

After an Agent 210 has completed the call, the Agent 210 will enter a state called "After Call Work." During this time, the Agent 210 should be completing their data entry forms within the pop-up window 300 so that they can log details and the disposition 320 of the call. The Presence system 230 may update the agent's status as "busy and after work." Once the data entry has been completed, the Agent 210 will submit their responses in the pop-up window 300 that includes settings the Agent's 210 assigned disposition 320 for the call. Once the disposition 320 has been set, the Agent's 210 status may be automatically updated as idle and available again and on the next system update, the CPD 260 will initiate more outbound calls for the Agent 210. In an exemplary embodiment however, once the Agent 210 has assigned a disposition 360 for its last call, the Agent's 210 phone line would remain open and the Agent 210 would not have to enter another Presence Code 280 into the APD 220.

In alternative embodiment, the Agent 210 can be required to enter another a Presence Code 280 into the APD 220 before the Agent 210 is connected to any new outbound calls. This would restart the process steps discussed above.

If the CPD 260 was unable to locate an Agent 210 within two (2) seconds of connecting the call, then the call will be considered abandoned per FCC regulations. The CPD 260 device will play to the Callee 270 the appropriate audio file, disconnect the call, and then make an API call to update the call disposition in the callee database. Additionally, a call termination event is sent to the Presence system 230.

If the C2C call that is placed to the Callee 270 fails to connect, an API call is made by the CPD 260 to set the disposition for the number (Disconnected, Busy, or Ring No Answer (RNA)) and the session terminates. If there is an unsuccessful connection, the exit reason (busy, disconnected, RNA) will be examined and recorded in a Callee disposition database within the CPD 260. The disposition of the call is recorded in the Callee disposition database for future reference.

Figure 4:
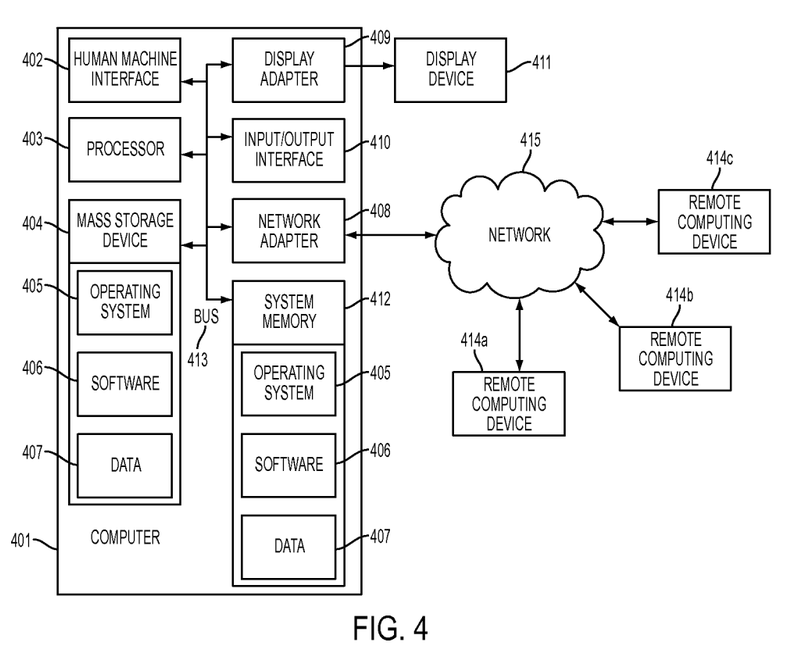
FIG. 4 is a block diagram of an exemplary computing environment that may be used in conjunction with example embodiments and aspects.

Turning now to FIG. 4, one skilled in the art will appreciate that the systems and methods disclosed herein can be implemented via a general-purpose computing device in the form a computer or computer server 401 (herein after "computer"). The features of the present invention including the APD 120, the Presence system 130, the PD server 140, the Registrar 150 and the CPD 160 are all applications executing on a server, cluster of servers, or other computing device. The components of the computer 401 can comprise, but are not limited to, one or more processors or processing units 403, a system memory 412, and a system bus 413 that couples various system components including the processor 403 to the system memory 412. In the case of multiple processing units 403, the system can utilize parallel computing.

The system bus 413 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Private Branch Exchange (PBX) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 413, and all buses specified in this description can also be implemented over a wired or wireless network connection and each of the subsystems, including the processor 403, a mass storage device 404, an operating system 405, software 406, data 407, a network adapter 408, system memory 412, an input/output interface 410, a display adapter 409, a display device 411, a human machine interface 402, can be contained within one or more remote computing devices 414a,b,c at physically separate locations, connected through buses of this form, in effect implementing a fully distributed system.

The computer 401 typically comprises a variety of computer readable media. Exemplary readable media can be any available media that are accessible by the computer 401 and comprise, for example, both volatile and non-volatile media, as well as, removable and non-removable media. The system memory 412 comprises computer readable media in the form of volatile memory, such as random access memory (RAM), and/or non-volatile memory, such as read only memory (ROM). The system memory 412 may contain data such as media, video, audio, or other data 407 and/or program modules such as an operating system 505 and software 406 capable of manipulating, translating, transcoding, or otherwise editing the data 407 that are immediately accessible to and/or presently operated on the by the processing unit 403.

In another aspect, the computer 401 can also comprise other removable/non-removable, volatile/non-volatile computer storage media. By way of example, FIG. 4 illustrates a mass storage device 404, which can provide non-volatile storage of computer code, computer readable instructions, data structures, program modules and other data for the computer 401. For example, a mass storage device 404 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 404, including by way of example, an operating system 405 and hosted VoIP PX software 406. Both the operating system 404 and hosted VoIP PX software 406 (or some combination thereof) can comprise elements of the programming and the hosted VoIP PX software 406. Media, video, audio, or other data 407 can be stored in any of one or more databases known in the art. Examples of such databases comprise, DB2®, Microsoft® Access, Microsoft® SQL Server, Oracle®, MySQL, PostgreSQL, and the like. The databases can be centralized or distributed across multiple systems. Examples of hosted VoIP PX software include Asterisk®, FreeSwitch®, or Microsoft Lync® server software.

In another aspect, the user can enter commands and information into the computer 401 via client device or an input device (not shown). Example of such input devices comprise a keyboard, pointing device (e.g., a "mouse"), a microphone, a joystick, a scanner, tactile input devices such as gloves, and other body coverings, and the like. These and other input devices can be connected to the processing unit 403 via a human machine interface 402 that is coupled to the system bus 413, but also can be connected by other interface and bus structures, such as a parallel port, game port, IEEE 1394 Port (also known as a Firewire port), a serial port, or a universal serial bus (USB).

In yet another aspect, a display device 411 can also be connected to the system bus 413 via an interface, such as a display adapter 409. It is contemplated that the computer 401 can have more than one display adapter 409, and the computer 401 can have more than one display device 411. For example, a display device can be a monitor, an LCD (Liquid Crystal Display), or a projector. In addition to the display device 411, other output peripheral devices can comprise components such as speakers (not shown) and a printer (not shown), which can be connected to the computer 401 via input/output interface 410. Any step and/or result of the methods can be output in any form to an output device. Such output can be any form of visual representation, including but not limited to, textual, graphical, animation, audio, tactile, and the like. The display 411 and computer 401 can be part of one device, or separate devices.

The computer 401 can operate in a networked environment using logical connections to one or more remote computing devices 414a,b,c. By way of example, a remote computing device can be a personal computer, portable computer, smartphone, softphone, client device, a server, a router, a network computer, a peer device or other common network node, and so on. Logical connections between the computer 401 and remote computing device 414a,b,c can be made via a network 415, such as a local area network (LAN) and or a general wide area network (WAN). Such network connections can be through a network adapter 408. A network adapter 408 can be implemented in both wired and wireless environments. Such networking environments are conventional and commonplace in dwellings, offices, enterprise-wide computer networks, intranets, and the Internet.

For purposes of illustration, application programs and other executable program components such as the operating system 405 are illustrated herein as discrete blocks, although it is recognized that such programs and components reside at various times in different storage components of the computing device 401, and are executed by the data processor(s) of the computer. An implementation of media manipulation software 406 can be stored on or transmitted across some form of computer readable media. Any of the disclosed methods can be executed by computer readable instructions embodied on computer readable media. Computer readable media can be any available media that can be accessed by a computer. By way of example and not meant to be limiting, computer readable media can comprise "computer storage media" and "communications media." "Computer storage media" comprises volatile and non-volatile, removable and non-removable media implemented in any methods or technology for storage of information such as computer readable instructions, data structures, program modules, or other data. Exemplary computer storage media comprises, but is not limited to RAM, ROM, EEPROM, flash memory or memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence (AI) techniques such as machine learning and iterative learning. Examples of such techniques include, but are not limited to, expert systems, case-based reasoning, Bayesian networks, behavior-based AI, neural networks, fuzzy systems, evolutionary computation (e.g. genetic algorithms), swarm intelligence (e.g. ant algorithms), and hybrid intelligent system (e.g. expert interference rules generated through a neural network or production rules from statistical learning).

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, mobile phones, softphones, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for establishing a communication session comprising:
an agent availability unit for connection to a plurality of agent terminals through open lines between each of the plurality of agent terminals and an inbound communications unit, the agent availability unit containing an availability status for each of the plurality of agent terminals,
a recipient database containing a plurality of recipient identifiers,
a recipient selection unit communicatively coupled to the agent availability unit and to the recipient database, wherein the recipient selection unit is configured to select one or more selected identifiers from the plurality of recipient identifiers based on a status indication received from the agent availability unit,
an outbound communication unit communicatively coupled to the recipient selection unit and to the agent availability unit, wherein the outbound communication unit is configured to:
 receive from the recipient selection unit the one or more selected identifiers,
 transmit a communication request directed to a first selected identifier of the one or more selected identifiers,
 receive an indication of communication acceptance,
 establish a first communication path with a recipient terminal associated with the first selected identifier, and
 transmit an agent selection request to the agent availability unit, and
a connection unit, wherein, responsive to receiving an agent selection request, the agent availability unit is configured to select a first agent terminal from the plurality of agent terminals,
wherein the inbound communications unit is configured to establish a second communication path with the first agent terminal through one of the open lines, and wherein the connection unit is configured to bridge the first communication path and the second communication path,
wherein the recipient selection unit transmits a communication request directed to a first selected identifier of the one or more selected identifiers via a specific outbound communication unit based on a recipient identifier, and
wherein the recipient selection unit uses an account-based domain name system (ABDNS) address that is based on the recipient identifier to transmit the communication request for specific recipients via a specific outbound communication unit.

2. The system according to claim 1, wherein the agent terminals indicate their availability status to the agent availability unit by sending a manual star code, click to call link, or automatically via a screen pop detection or heart beat ping.

3. The system according to claim 1, wherein the agent availability unit makes an agent selection by matching an available agent terminal with an assigned calling campaign associated with a recipient identifier.

4. The system according to claim 1, wherein the agent availability unit selects the first agent terminal to receive the second communication path based upon an agent terminal that has been idle for the longest period of time, an available agent terminal associated with the recipient identifier, or an agent terminal performance measure.

5. The system according to claim 1, wherein the agent availability unit is a registry cache that contains the current state of all agent terminals to indicate whether they are idle, on a call or in after-call-work mode.

6. The system according to claim 1, wherein when the agent availability unit selects a first agent terminal from the plurality of agent terminals to connect with the connection unit, the agent availability unit updates the available agent terminal with information associated with the first selected identifier in a screen pop.

7. The system according to claim 1, wherein the plurality of agent terminals are communicatively connected to the inbound communications unit via a direct connection, a network, a PSTN or a PBX system.

8. The system according to claim 1, wherein the connection unit bridges the first communication path and the second communication path via a direct connection, a network connection, a PSTN or a PBX.

9. A method for establishing a communication session comprising:
establishing a plurality of communication paths with each of a plurality of agent terminals through open lines between each of the plurality of agent terminals and an inbound communications unit, wherein the plurality of communication paths includes a first communication path established with a first agent terminal of the plurality of agent terminals,
receiving a plurality of indications of agent availability, wherein each of the plurality of indications of agent availability is associated with one of the plurality of agent terminals, and wherein the plurality of indications of agent availability includes a first indication of agent availability associated with the first agent terminal,
selecting one or more recipient terminals based on the plurality of indications of agent availability,
transmitting a communication request to a first recipient terminal of the one or more recipient terminals,
receiving an indication of communication acceptance,
establishing a second communication path with the first recipient terminal through one of the open lines, and
bridging the first communication path with the second communication path, based on the first indication of agent availability,
wherein the communication request to a first recipient terminal of the one or more recipient terminals is transmitted using an account-based domain name system (ABDNS) address that is based on a selected recipient identifier.

10. The method according to claim 9, wherein indications of agent availability can include sending a manual star code, selecting click to call link, or automatically via a screen pop detection or heart beat ping, and the like.

11. The method according to claim 9, wherein an indicator of agent availability can include an indication that an agent is idle, on a call or in after-call-work mode.

12. The method according to claim 9, wherein the first recipient terminal is selected for establishing a second communication path based upon an agent terminal that has been idle for the longest period of time or an agent terminal performance measure.

13. The method according to claim 9, wherein when the second communication path is established with the first recipient terminal, the indicator of agent availability is updated to provide the first agent terminal with an indicator associated with the first recipient terminal.

14. The system of claim 1, wherein one or both of the inbound communications unit and the outbound communications unit form the connection unit.

15. A system for establishing a communication session, comprising:
   an Agent Progressive Dialer (APD) to connect to a plurality of agent terminals, each of the agent terminals connecting to the APD through an open line, wherein the plurality of agent terminals includes a first communication path through one of the open lines established with a first agent terminal of the plurality of agent terminals;
   a Callee Progressive Dialer (CPD) to connect to a plurality of recipient terminals and to establish a second communication path with a first recipient terminal of the plurality of recipient terminals,
   wherein, upon establishing the second communication path, one or both of the APD and the CPD bridge the second communication path and the first communication path,
   wherein a communication request to the first recipient terminal of the plurality of recipient terminals is transmitted using an account-based domain name system (ABDNS) address that is based on a selected recipient identifier.

16. The system of claim 15, further comprising:
   a PBX presence system to connect to the plurality of agent terminals through the APD, and containing an availability status of each of the plurality of agent terminals.

* * * * *